United States Patent [19]

Fish et al.

[11] Patent Number: 4,708,244
[45] Date of Patent: Nov. 24, 1987

[54] FISHING LINE SPOOL HOLDER FOR A TACKLE BOX

[76] Inventors: Gerald N. Fish, 104 Surf Dr.; Joseph J. Cossuth, 44-D Woodland Ave., both of Cocoa Beach, Fla. 32931

[21] Appl. No.: 909,214

[22] Filed: Sep. 19, 1986

[51] Int. Cl.[4] .................... B65D 25/04; B65D 85/04
[52] U.S. Cl. ................... 206/315.11; 43/54.1; 206/373; 242/137.1
[58] Field of Search ............... 43/54.1, 57.1, 44.98; 206/315.11, 349, 373; 242/137.1

[56] References Cited

U.S. PATENT DOCUMENTS

| | | | |
|---|---|---|---|
| 1,791,346 | 2/1931 | Burch et al. | 43/57.1 |
| 2,370,013 | 2/1945 | Crowell | 206/315.11 |
| 2,586,170 | 2/1952 | Lawrenz | 43/54.1 |
| 2,765,576 | 10/1956 | Kurek | 43/54.1 |
| 2,814,904 | 12/1957 | Reedall | 43/54.1 |
| 2,999,621 | 9/1961 | Kiser | 43/57.1 |
| 3,154,063 | 10/1964 | White | 43/54.1 |
| 3,490,169 | 1/1970 | Tweed | 206/315.11 |
| 4,628,628 | 12/1986 | Burgin et al. | 206/315.11 |

FOREIGN PATENT DOCUMENTS 0329673  5/1930  United Kingdom .................. 43/54.1

*Primary Examiner*—Jimmy G. Foster
*Attorney, Agent, or Firm*—Shlesinger, Arkwright & Garvey

[57] ABSTRACT

A fishing line spool holder for a tackle box having a tray therein, for facilitating the transfer of fishing line from the fishing line spool holder to a fishing reel, the spool holder including a spindle on which the fishing spool is rotatably mounted, a support for holding the spindle and means for engaging the support with the tackle box tray. One end of the spindle is adjustedly located at different distances from the tray for transferring fishing line from different size spools which are rotatedly mounted on these spindles between the outer end thereof and the tray.

10 Claims, 7 Drawing Figures

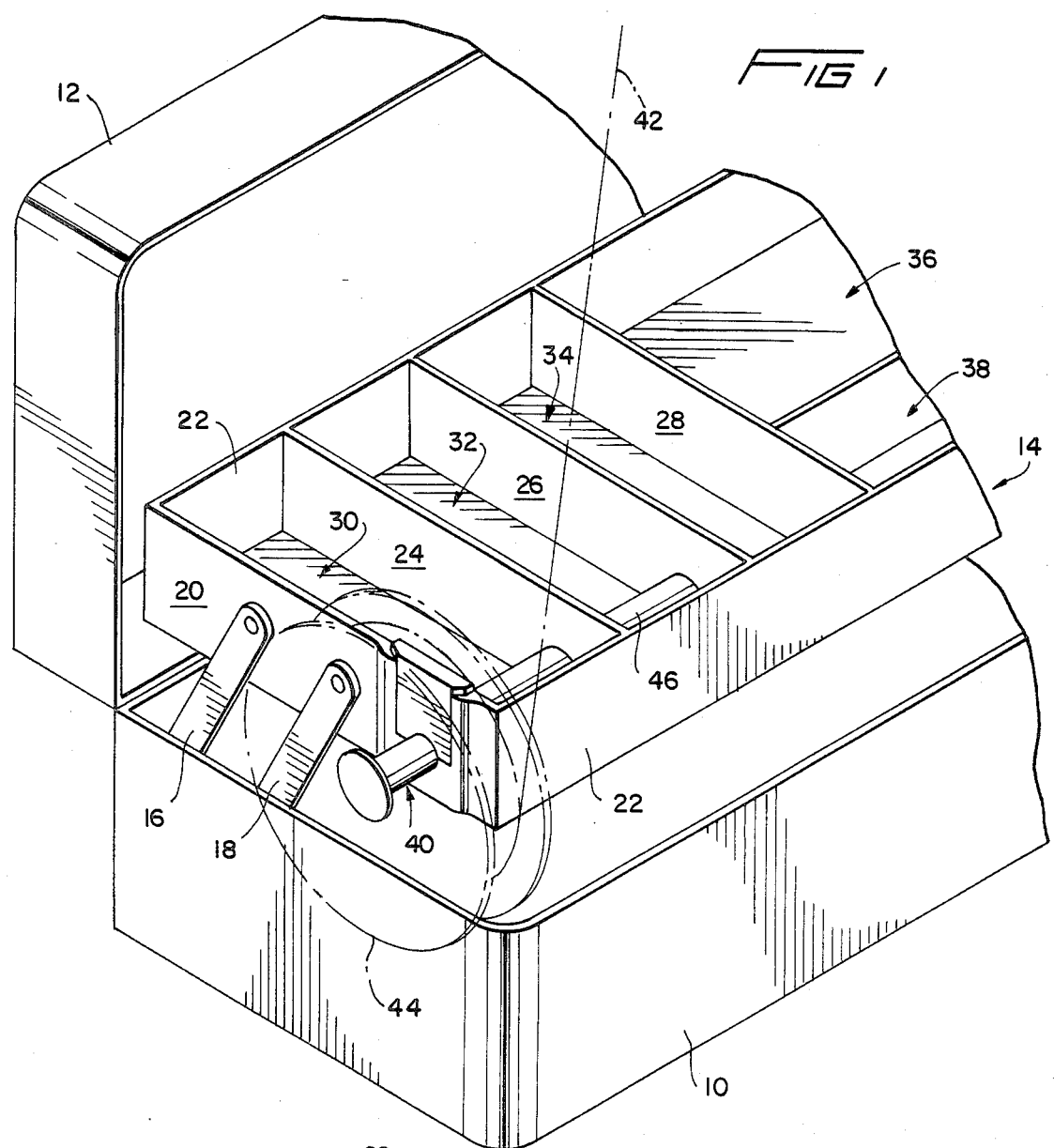
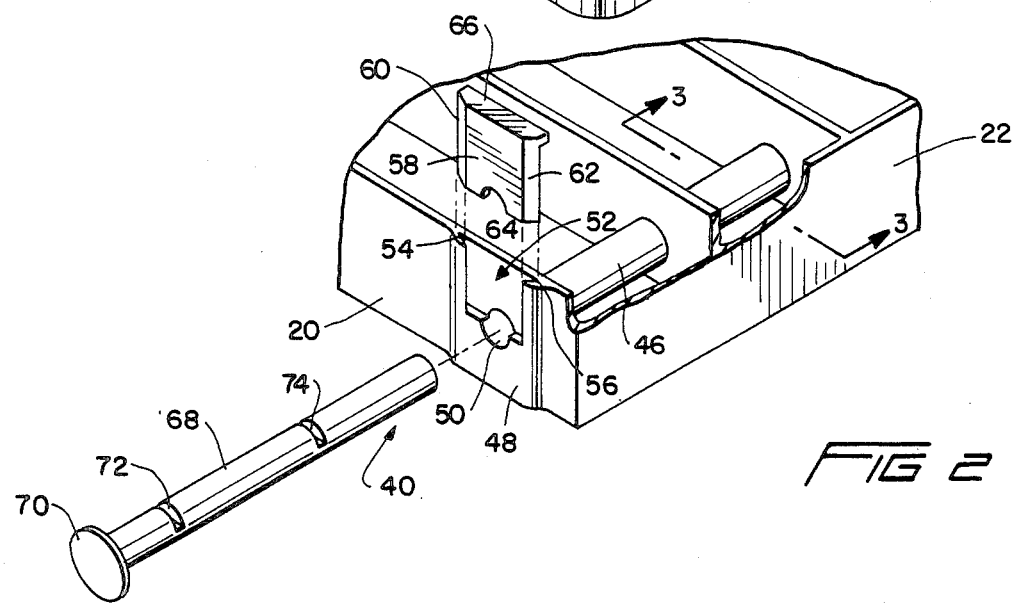

1

FISHING LINE SPOOL HOLDER FOR A TACKLE BOX

This invention is a fishing line spool holder which is attached to the tray of a fishing tackle box for facilitating the transfer of fishing line from the spool holder to a fishing reel.

BACKGROUND OF THE INVENTION

It is frequently necessary for fishermen to transfer fishing line from a storage spool onto a fishing reel. This can readily be done by two persons, one holding the fishing line reel and the other holding the storage spool. However, it is very difficult for one person to effect this transfer since it is necessary to place the storage spool on the ground or other surface and then unwind the fishing line from the spool onto the reel. Usually the storage spool moves, thereby making it more difficult to transfer the line onto the reel. Additionally, there is the danger that the fishing line will become tangled during the transfer to the reel, which can cause problems when casting the line from the reel.

The transfer of line from the storage spool onto the fishing reel is, therefore, time consuming and often unsatisfactory.

SUMMARY OF THE INVENTION

The present invention is an attachment for a fishing tackle box for holding a fishing line storage spool, and to permit rotational movement thereof for effecting transfer of the line to a fishing reel by one person.

This attachment includes a spindle support which may be either integrally formed with, or detachably engaged with a tray in the fishing tackle box, and a spindle on which the fishing line spool is rotatably mounted, which spindle is engaged with the spindle support for holding the spindle and storage spool during the transfer of line to a fishing reel.

The attachment of the present invention is of simple, economic construction, which is readily made available for use, and which may be stored within the fishing tackle box when not needed.

The present attachment is adjustable for accommodating storage spools of different sizes, and which is provided with locking means for preventing relative longitudinal movement of the spindle with respect to the spindle support and fishing tackle box.

DESCRIPTION OF FIGURES OF THE DRAWINGS

FIG. 1 is a fragmentary perspective view of a fishing tackle box in the open position, illustrating the application of the attachment of the present invention thereto;

FIG. 2 is an exploded fragmentary perspective view of the attachment of the present invention in a fishing tackle box tray.

DESCRIPTION OF PREFERRED EMBODIMENTS OF THE PRESENT INVENTION

Figure 3:
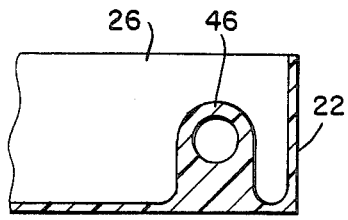
FIG. 3 is a sectional view taken along the line 3—3 of FIG. 2, looking in the direction of the arrows.

In the form of invention illustrated in FIGS. 1 and 2, there is illustrated a fishing tackle box of generally conventional construction including a base 10 to which is hingedly engaged a top 12, and having within the base 10 a tray 14 which is hingedly connected to base 10 by a pair of arms 16 and 18, which permit the tray to be swung upwardly from the base in a well known manner, for access to the contents of the base.

Tray 14 is preferably of molded plastic construction, and includes end walls 20 and side walls 22. A series of spaced interior walls 24, 26 and 28 extend between side walls 22 to provide a plurality of storage compartments 30, 32, 34, 36 and 38.

In accordance with the objects of the present invention, there is provided an attachment generally designated 40 which is engaged with tray 14 for permitting transfer of fishing line 42 from storage spool 44. In the form of invention illustrated in FIGS. 1 and 2, attachment 40 is integrally formed with tray 14, and includes a tubular member providing a spindle support 46 which extends through openings in panels 24 and 26 adjacent one side 22 of tray 14.

Wall 20 of tray 14 proximate spindle support 46 is thickened at 48 for a substantial portion of the height of wall 20, and is provided with a circular opening 50 which is aligned with, and is of substantially the same size as, the opening in tubular spindle support 46. As shown to advantage in FIG. 2, the upper portion of wall 20 superjacent thickened portion 48 is recessed to provide a slide track 52 having vertical opposed guideways 54 and 56. A locking slide 58 of complemental shape is slidedly engaged with slide track 52. Locking slide 58 is of substantially flat shape and includes a body portion, the lateral edges of which are beveled as indicated at 60 and 62 for slidable engagement in guideways 54 and 56 of slide track 52. The lower edge of locking slide 58 is provided with an arcuate opening 64 which is aligned with opening 50 of thickened portion 48 of wall 20, for purposes which will be hereinafter more fully set out. The upper edge of locking slide 58 is enlarged to provide an inwardly directed flange 66 which is adapted to engage the top edge of wall 20 to limit the downward movement of locking slide 58 within slide track 52.

In accordance with the present invention, there is provided an elongated spindle 68 having an enlarged head 70 at one end thereof, the spindle being adapted to be inserted through opening 50 into spindle support 46. The body portion of spindle 68 is of uniform diameter and of a size to be inserted through the central opening of spool 44.

As shown in FIG. 2, the outer periphery of spindle 68 is provided with a plurality of spaced notches 72 and 74 which are selectively engaged by the lower edge of locking slide 58 at the locus of arcuate opening 64 to positively lock spindle 68 in place to prevent relative longitudinal movement between the spindle and tray 14. By providing two or more notches in the spindle periphery, fishing lines spools 44 of different widths may be accommodated on spindle 68 which, as shown to advantage in FIG. 1, holds the spool between head 70 of spindle 68 and the side edge of tackle box base 10.

As shown in FIGS. 1 to 3, the present attachment may be integrally formed with the tray 14 which is conventionally of molded plastic construction to further facilitate the manufacture and reduce the cost thereof.

In use of the attachment of the present invention, spool 44 is first mounted on spindle 68, after which the spindle is inserted through opening 50 into spindle support 46. Locking slide 58 is then inserted into slide track 52 until the lower edge thereof selectively engages notch 72 or 74, so that the spool is rotatedly mounted on the spindle between head 70 and wall 20 of tray 14. The end of the fishing line 42 is then secured to the fishing reel and the fishing reel rotated to transfer the line from the storage spool 44.

After the transfer of fishing line is completed, locking slide 58 is withdrawn, spindle 68 removed from spindle support 46, and spool 44 removed from spindle 46.

Spindle 68 may then be stored within the fishing tackle box when not needed, and locking slide 58 reinserted into slide track 52.

Figure 4:
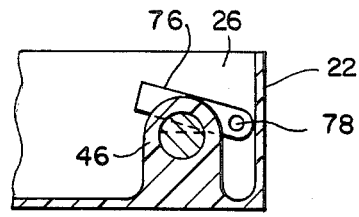
FIG. 4 is a view similar to FIG. 3 illustrating a modified form of the present invention.
Figure 5:
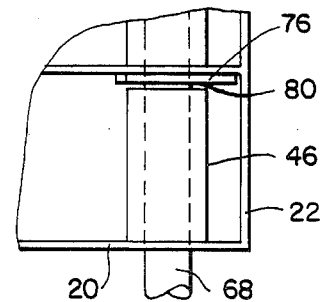
FIG. 5 is a top plan view illustrating the modified form of the invention illustrated in FIG. 4.

In FIGS. 4 and 5 there is illustrated a modified form of the present invention wherein the locking means for preventing relative longitudinal movement of spindle 68 with respect to spindle support 46 is prevented by a flat arm 76 which is pivoted at one end by a pin 78 to a compartment wall 24. Adjacent pin 78, tubular spindle support 46 is slotted as indicated at 80 to permit arm 78 to be swung through the slot into engagement with notch 72 or 74. This retains spindle 68 in fixed relation to spindle support 46 in the same manner as in the form of invention ilustrated in FIGS. 1 to 3.

Figure 7:
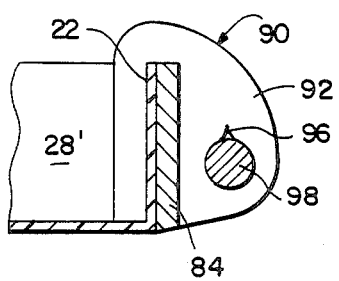
FIG. 7 is a sectional view taken along the line 7—7 of FIG. 6 looking in the direction of the arrows.
Figure 6:
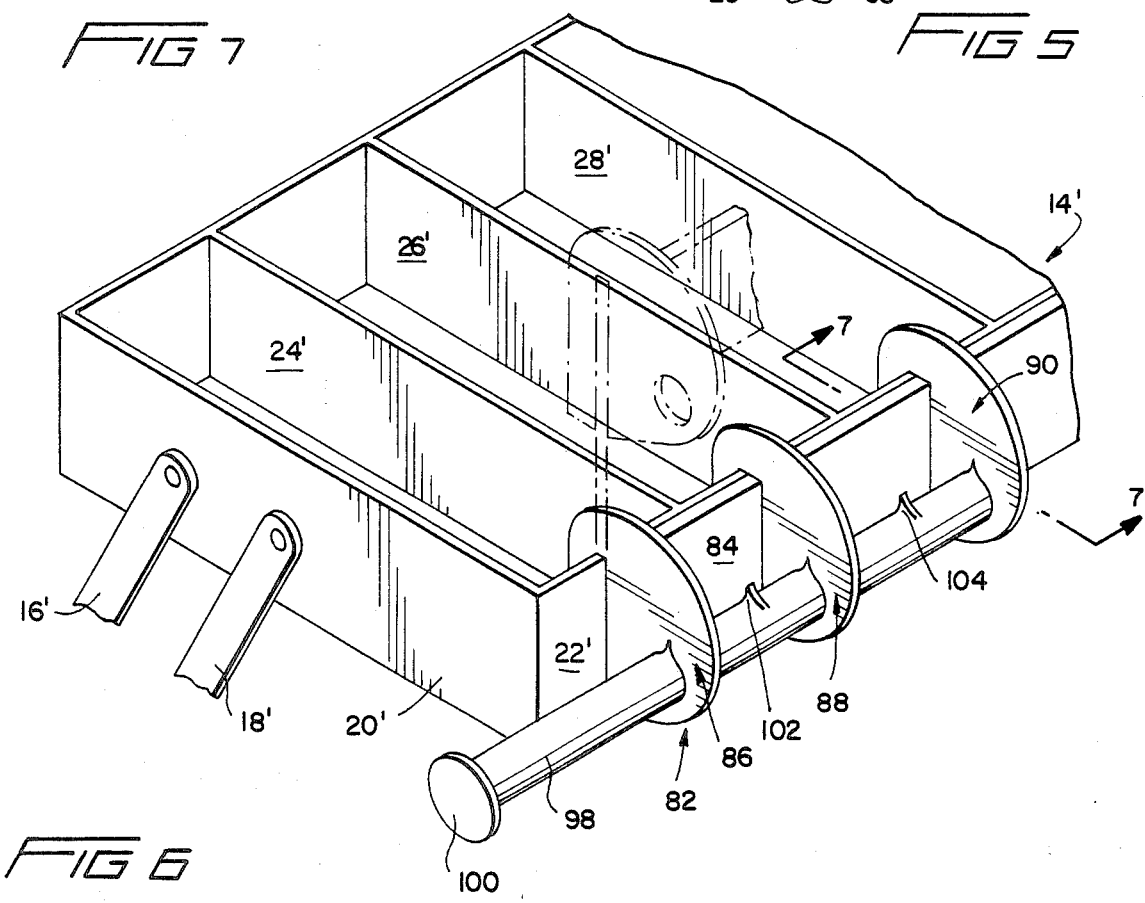
FIG. 6 is a fragmentary perspective view of a fishing tackle box tray, illustrating a modified form of the present invention.

In FIGS. 6 and 7 there is illustrated another modified form of the present invention which is particularly adapted for attachment to an existing fishing tackle box of conventional construction. In this form of the invention, the tray of the fishing tackle box is designated 14', the arms connecting the tray to the fishing tackle box base are indicated at 16' and 18', the end wall is shown at 20' and the side walls at 22' and the interior walls are shown at 24', 26' and 28'. The fishing line spool holder is generally designated 82, and includes a horizontal bar 84 to which is secured a plurality of like, spaced securing segments 86, 88 and 90. As shown to advantage in FIG. 7, each segment includes a body portion 92 of generally disk shape having a tapered slot 94 extending upwardly from the lower edge thereof adjacent bar 84 whch is adapted for engagement with a side wall 22' of tray 14' for holding the spool holder in position for use. A keyed opening 96 is located between bar 84 and a lateral edge of body portion 92.

Referring to FIG. 6, it will be seen that when spool holder 82 is engaged with tray 14', keyed openings 96 are in aligned position for receiving a spool holding spindle 98 having a head 100 at its outer end. In spaced relation to head 100, there are provided a plurality of spaced keys 102 and 104 which extend upwardly from the outer periphery of spindle 98, which keys are of a size to pass through the key-shape openings 96 of members 86, 88 and 90. When spindle 98 is inserted through members 86, 88 and 90 to the desired extent, then rotation of the spindle will prevent accidental disengagement of the spindle from the attachment by preventing withdrawal of the spindle therefrom.

The use of the attachment shown in FIGS. 6 and 7 is similar to that illustrated in the forms of invention shown in FIGS. 1 to 5 and, in this form of the invention also, the spindle is adjustable for accommodating fishing line spools of different sizes.

The fishing line spool holder of the present invention affords simple but efficient and economic means for rapidly and easily transferring fishing lines from a storage spool to a fishing reel by one person, by means of an attachment which may be an integral part of his fishing tackle box or which may be readily attached thereto, and then disengaged therefrom for storage within the box when not in use.

While there has herein been disclosed the presently preferred forms of this invention, it is to be understood that such is done for purposes of illustration only and that various changes may be made within the scope of the appended claims.

What is claimed is:

1. In combination with a fishing tackle box, a fishing line spool holder engaged with said tackle box to facilitate the transfer of fishing line from a fishing line spool to a fishing reel, the spool holder comprising
   (a) an elongated spindle on which the fishing line spool is rotatably mounted in substantially the same plane as the fishing reel;
   (b) a spindle holder into which the spindle is inserted, and
   (c) means for removably engaging said spindle holder with the fishing tackle box;
   (d) a portion of said spindle extending beyond said spindle holder and fishing tackle box a predetermined distance, whereby the fishing line spool is rotatably mounted on the spindle between one end thereof and the fishing tackle box.

2. The spool holder of claim 1, wherein
   (a) a portion of the outer periphery of said spindle is notched intermediate the length thereof, and
   (b) a locking member carried by said tackle box, said locking member being movable into engagement with the spindle notch to lock said spindle in position relative to the tackle box.

3. The spool holder of claim 2, with the addition of
   (a) a second notch on said spindle, said notches being selectively engaged by said locking member to locate one end of said spindle at different predetermined distances from the tackle box.

4. The spool holder of claim 1, wherein
   (a) said spindle holder comprises a plurality of spaced members, having aligned circular openings
   (b) said spindle being inserted through the aligned circular openings, and
   (c) means for attaching said spaced members to the tackle box.

5. The spool holder of claim 4, wherein
   (a) said spaced members are provided with keyed openings;
   (b) a plurality of spaced keys extending from the periphery of said spindle, said keys being of a size to pass through the keyed openings of said spaced members whereby, upon rotation of said spindle relative to said spaced members accidental disengagement of the spindle from said spaced members is prevented.

6. In combination with a fishing tackle box having a tray therein including a plurality of walls forming a series of storage compartments, a fishing line spool holder engaged with the tackle box tray to facilitate the transfer of a fishing line spool to a fishing reel, the spool holder comprising
   (a) a spindle on which the fishing line spool is rotatably mounted;
   (b) a support for holding said spindle comprising a tubular member which extends through the walls of the tray and through said compartments, a portion of said spindle being positioned within said tubular member, and (c) means interiorly of the tackle box tray for engaging said support with the tray of the fishing tackle box;

(d) a portion of said spindle extending beyond said tubular member for a predetermined distance for rotatably supporting the fishing line spool thereon.

7. The fishing line spool holder of claim 6, wherein (a) a portion of the outer periphery of said spindle is notched intermediate the length thereof, and (b) a locking member carried by one of the walls of the tackle box tray, said locking member being movable into engagement with the spindle notch to lock said spindle in position.

8. The fishing line spool holder of claim 7, with the addition of (a) a second notch on said spindle, said notches being selectively engaged by said locking member to locate one end of said spindle at different predetermined distances from the tray.

9. In combination with a fishing tackle box having a tray therein including a plurality of walls forming a series of storage compartments, a fishing line spool holder engaged with the tackle box tray to facilitate the transfer of fishing line from a fishing line spool to a fishing reel, the spool holder comprising (a) a spindle on which a fishing line spool is rotatably mounted;

(b) a support for holding said spindle;

(c) said support comprising a bar;

(d) a plurality of spaced support segments mounted on said bar;

(e) each of said support segments having an opening, the openings of the segments being aligned;

(f) said spindle being inserted through the alinged openings of the support segments, and (g) means exteriorly of the tackle box tray for engaging said support segments with the tray of the fishing tackle box.

10. The fishing line spool holder of claim 9, wherein (a) said means includes a slot in each of said support segments engaged with one of the tray walls.

* * * * *